March 14, 1933.  M. G. CORNET  1,900,914
SYSTEM FOR PREVENTING THE DERAILMENT OF SCREW DRIVEN VEHICLES
Filed Dec. 11, 1930  3 Sheets-Sheet 3
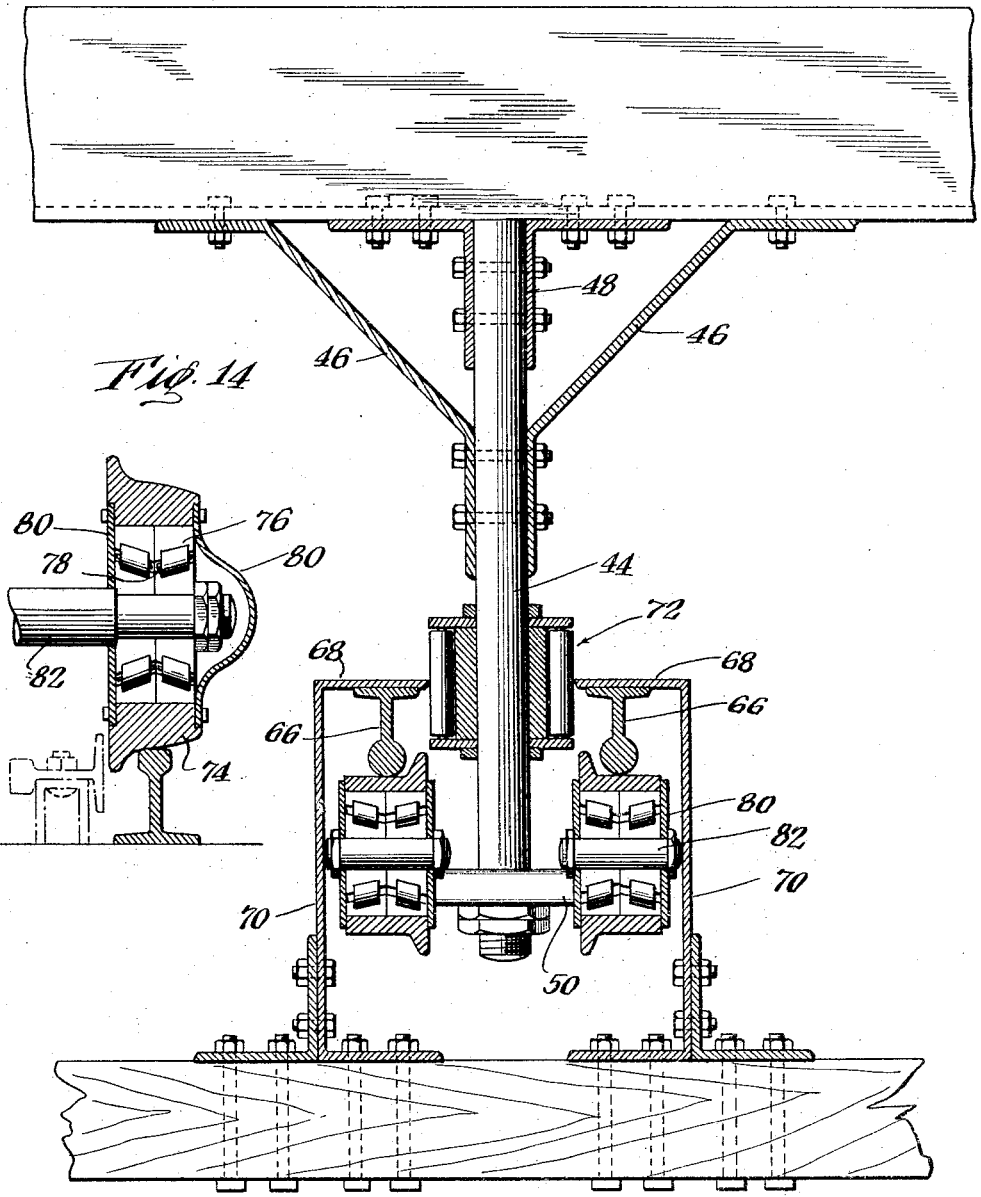
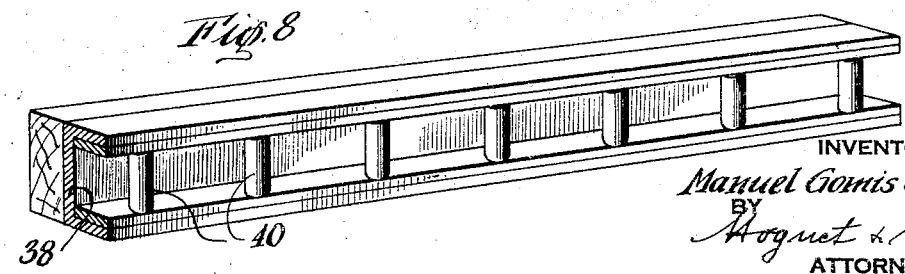
INVENTOR
Manuel Gomis Cornet
BY
Hoguet & Neary
ATTORNEYS Patented Mar. 14, 1933

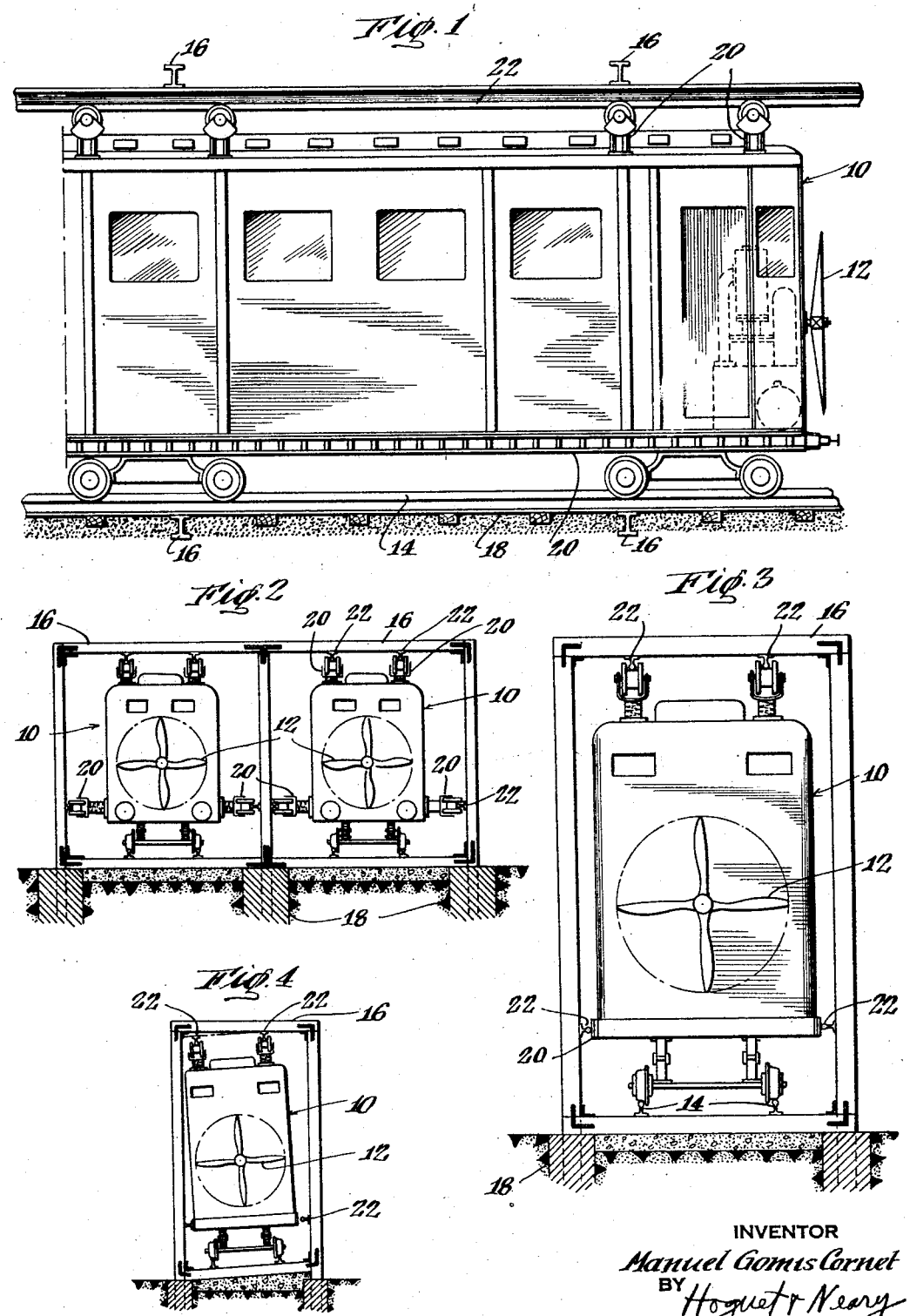

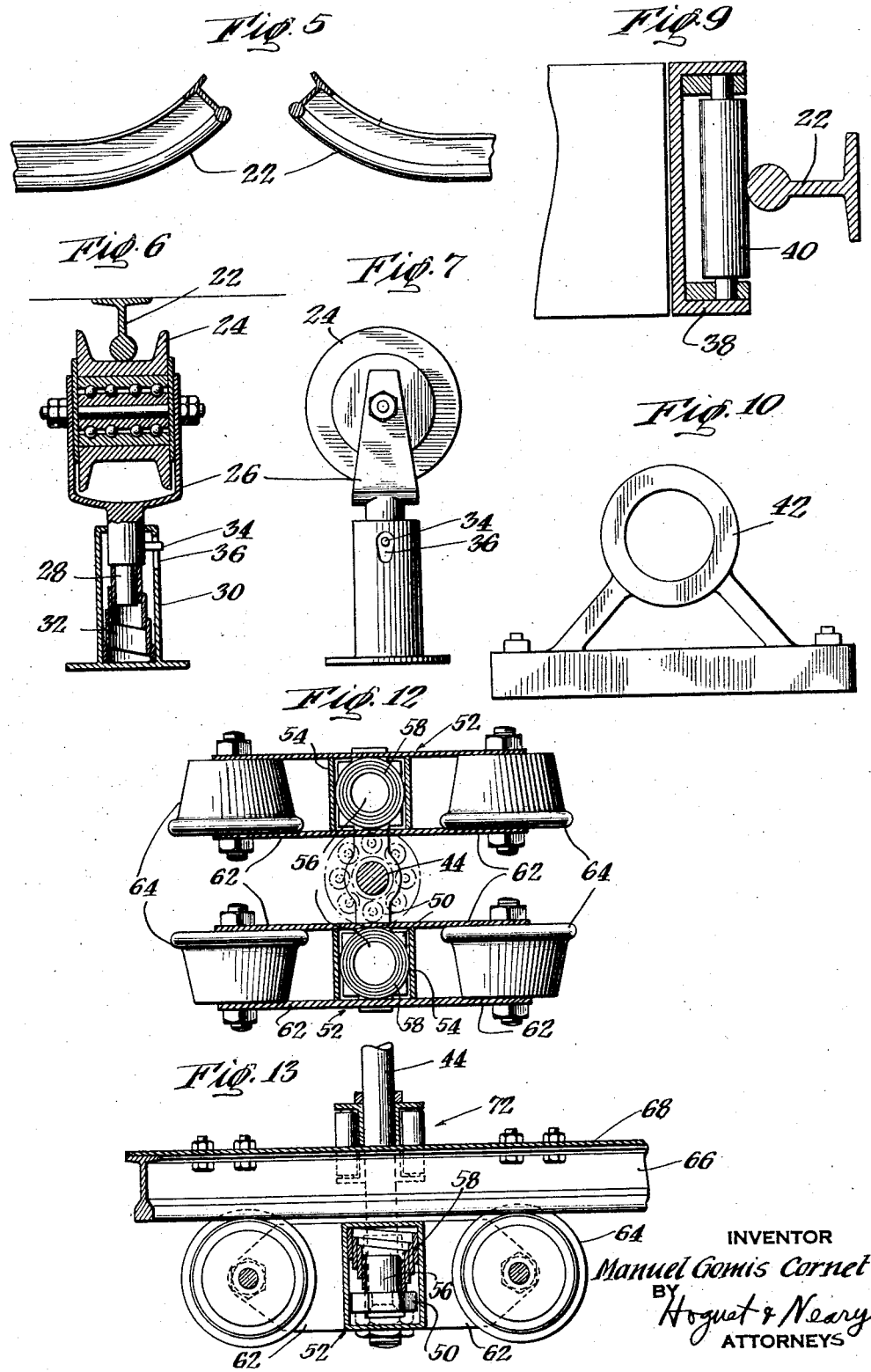

1,900,914

UNITED STATES PATENT OFFICE

MANUEL GOMIS CORNET, OF MADRID, SPAIN

SYSTEM FOR PREVENTING THE DERAILMENT OF SCREW-DRIVEN VEHICLES

Application filed December 11, 1930, Serial No. 501,729, and in Spain December 11, 1929.

The present invention relates to a system for preventing the derailment of propeller driven vehicles, particularly vehicles of that type which run on rails supported inside a metal structure within which the vehicles move.

The application of propeller propulsion to railway locomotion entails the reduction of dead weight if the advantages of a technical and economical order are to be secured with this mode of propulsion. As a natural and logical result of the reduction of weight and of the speed at which such vehicles are propelled, such vehicles are subject to derailment which makes it necessary to solve anew one of the earliest and most important railway transportation problems, the prevention of derailment.

The main object of this invention is to provide means for preventing the derailment of vehicles driven at the high speeds which are possible with the use of means such as propellers for operating the same. Other objects will appear in the following description.

In accordance with my invention, the tracks for the railway vehicles are laid inside a metal frame in which the vehicles are adapted to travel. Derailment-preventing elements are applied to the tops, sides, and bottoms of the vehicles. Rails are provided within the metal frame work to engage the derailment-preventing elements. The structure of these derailment-preventing devices depends largely upon their position on the vehicle. The structure of these elements also depends to some extent on the conditions under which the railway line is operated; for example, the speed at which the vehicles are propelled, the radius of the curves in the line, the nature of the materials of the vehicles, and the shape thereof.

To enable those skilled in the art to more readily understand my invention and the manner in which the same may be carried out, I have illustrated a preferred embodiment of my invention in the accompanying drawings in which:

Figure 1 represents a side view of a vehicle, illustrating the application of my invention thereto;

Figure 2 represents an end view partly in section, showing two trains operating on double tracks and provided with devices according to my invention;

Figure 3 represents a modified construction of derailment-preventing device applied to a vehicle;

Figure 4 represents an end view of a vehicle with parts in section, illustrating the application and operation of my invention when there is a curve in the line;

Figure 5 represents a view of an advantageous construction of the rails where there is a break in the continuity thereof;

Figure 6 represents a vertical section of an advantageous construction of a derailment-preventing device to be applied to the top of a vehicle;

Figure 7 is a view from the right of the device shown in Figure 6;

Figure 8 represents a perspective view of a derailment-preventing device to be applied to the side of a vehicle;

Figure 9 represents a vertical section through the device of Figure 8 showing the relationship of the parts;

Figure 10 represents a modification of the device shown in Figure 8;

Figure 11 represents an advantageous construction of a derailment preventing device to be applied to the bottom of a vehicle;

Figure 12 represents a plan view partly in section of the parts shown in Figure 11;

Figure 13 represents a view looking from the right of Figure 11 with parts in section; and Figure 14 is in part a sectional view of a wheel such as may be used in the structure of Figures 11, 12 and 13.

Referring more particularly to the drawings, vehicles 10 driven by propellers 12 travel on tracks 14 supported within a plurality of rectangular frames 16 laid upon and joined by sleepers 18 or other suitable means. These frames may be held in place and reinforced in any suitable way. The railway vehicles ride upon the tracks and within the rectangular frames and are provided with derailment-preventing devices 20 which bear against a plurality of suitably positioned guide rails 22, as shown in Figures 1 to 4 inclusive. It will be appreciated that the road bed is generally horizontal but when there is a curve in the line the road bed is suitably banked, as shown in Figure 4. Under these circumstances the rails which are engaged by the derailment-preventing devices are suitably placed so as to aid the banked track in keeping the vehicles from going off the track or turning over. Where a gap must necessarily be left in the guide rails, as, for example, at the entrance to a station, the rails are curved at their free ends as shown in Figure 5 so as to enable the derailment-preventing devices to readily ride off the end of one rail and on to the other rail after passing the gap between the two.

I have discovered that in applying the derailment-preventing devices to a propeller driven train, the devices applied to the different parts of the cars must be differently constructed, due to the differences in the direction and the amount of the stresses and strains thereon. For example, the devices at the top and bottom of the cars must be so constructed that they can give with the unevennesses in the track and will absorb the shocks caused by such unevennesses. Moreover, such unevennesses in the track tend to vary the distance between the tracks and the rails positioned above the vehicles. These derailment-preventing devices placed on the top of the vehicles should be constructed to automatically adjust themselves to these differences. On the other hand, the stresses caused by the tendency of the cars to sway are not so great as the vertical streses and unevenesses in the roadbed do not noticeably affect the distances between the side guide rails; hence the derailment-preventing devices positioned on the sides of the vehicles need not be so resilient. Also, since the cars must be allowed to move vertically to a certain extent, in accordance with unavoidable unevennesses in the roadbed, the side derailment-preventing devices should be so formed as to allow vertical movement of the vehicles.

Referring now more particularly to Figures 6 and 7, which disclose an advantageous construction of derailment-preventing device to be applied to the top of the vehicle, a sheave 24 is supported on a yoke 26 and is provided with ball bearings. The shank 28 of the yoke 26 extends into a casing 30 and rests upon a suitable spring 32. The shank 28 is provided with an outwardly extending member or pin 34, which extends through an opening 36 in the casing 30, which opening is appreciably larger than the diameter of the pin 34 to permit vertical and lateral or rotary play of the shank and sheave carried thereby. In this device the spring has sufficient strength to take up much of the shock of the car which tends to rise off the track at the high speed under which it travels, particularly in passing over unevennesses in the roadbed. The pin 34 further limits the movement of the vehicle and aids in bringing it to a definite stop in its vertical movements and also prevents undesirable rotation of the yoke 26.

The derailment-preventing devices provided on the sides of the vehicle are advantageously constructed in the form of long U-shaped members 38, as shown in Figures 8 and 9, and are attached to the opposed sides thereof. A series of rolls 40 are rotatably mounted in the U-shaped members 38 to turn about vertical axes and are made of appreciable height to allow for movement thereof relative to the guide rails. These derailment-preventing devices provided on the sides of the vehicle are non-resiliently mounted and prevent the vehicle from swaying or leaving the track on a tangent and also tend to prevent the flanges of the wheels of the vehicle and of the other derailment-preventing devices from grinding against the sides of the rails.

In the place of the long U-shaped members shown in Figures 8 and 9, a series of brackets 42, such as those shown in plan in Figure 10, may be provided having suitable rolls rotatably mounted therein.

As shown in Figures 11 to 13 inclusive, suitable derailment-preventing devices are also positioned beneath the vehicles. These derailment-preventing devices comprise vertical shafts 44 secured to the bottom of the vehicles by means of suitable brackets 46 and 48 and have suitable yokes or plates 50 secured adjacent the lower ends. Wheel-carrying trucks 52 are secured to each plate 50 on opposite sides of the shaft 44. Each truck has formed therein a spring casing 54 containing a suitable spring 58 surrounding a vertically extending stud 56 carried by the yoke 50 so that the yoke can slide vertically relative to the casings. Extending forwardly and rearwardly from the spring casing are plates 62 between which the wheels 64 are secured. These wheels are adapted to roll along the lower surfaces of inverted guide rails 66 mounted upon the under surfaces of flanges 68 of the I-shaped brackets 70. Roller bearings 72 are provided about the shaft 44 to be engaged by the inner edges of the upper flanges 68 of the brackets 70 and to protect the shaft from bearing against such flanges and being worn.

The wheels used for this type of derailment-preventing device are preferably constructed as shown in Figures 11 and 14. In such figures, detachable tires 74 are mounted to bear on bearings composed of divergent rollers 76 mounted on pivots 78 between plates 80 which are mounted upon axles 82. Wheels so constructed readily take the radial and axial stresses and avoid the use of grease boxes or other lubricating means. This type of wheel may also be used for the usual wheels rolling upon the tracks.

This type of derailment-preventing device used on the bottom of the car acts not only to prevent the car from rising from the tracks but acts also as a shock absorber and a stabilizer and, due to its construction, is able to take up or withstand very great stresses and strains.

While I have shown and described the preferred construction whereby the principles of my invention may be carried out it will be apparent to one skilled in the art that many changes may be made in the details of the structure and arrangement of parts without departing from the spirit of my invention as defined in the following claims.

I claim:

1. In combination with a vehicle, a frame structure enclosing the vehicle, tracks supported within the frame on the bottom thereof for supporting said vehicle for travel within said frame, guide rails positioned within the frame at the top, sides and bottom thereof extending in parallel relation to said tracks, and derailment-preventing means secured to the top, sides and bottom of the vehicle and engaging said guide rails.

2. In combination with a vehicle, a frame structure enclosing the vehicle, tracks supported in the frame on the bottom thereof for supporting the vehicle for travel within said frame structure, guide rails positioned within the said frame at the top, side and bottom thereof extending in parallel relation to said tracks, resilient derailment-preventing means secured to the top and bottom of the vehicle and engaging the top and bottom guide rails, and non-resilient derailment-preventing means secured to opposed sides of the vehicle and engaging said side guide rails.

3. In combination with a vehicle, a frame structure enclosing the vehicle, tracks supported within the frame structure on the bottom thereof, transversely spaced guide rails secured within the frame at the top thereof extending in parallel relation to said tracks, transversely spaced resilient derailment-preventing members secured to the top of the vehicle and engaging said guide rails, transversely spaced inverted guide rails secured adjacent the bottom of the frame structure, transversely spaced resilient derailment-preventing members connected to the bottom of the vehicle and engaging said inverted guide rails, guide rails secured to the sides of the frame structure, and non-resilient derailment-preventing members secured to the sides of the vehicle and engaging the last mentioned guide rails.

4. In combination with a vehicle, a frame structure enclosing the vehicle, tracks supported in the frame on the bottom thereof for supporting the vehicle for travel within said frame structure, guide rails positioned within the said frame at the top, sides, and bottom thereof extending in parallel relation to said tracks, resilient derailment-preventing means secured to the top and bottom of the vehicle and engaging the top and bottom guide rails, and non-resilient derailment-preventing means secured to opposed sides of the vehicle and engaging said side guide rails, said non-resilient derailment-preventing means comprising U-shaped brackets carrying flangeless rollers of appreciable length rotatably mounted to turn about vertical axes and roll along the said side guide rails.

5. In combination with a vehicle, a frame structure enclosing the vehicle, tracks supported within the frame on the bottom thereof, guide rails secured within the frame at the top, sides and bottom thereof extending in parallel relation to the tracks, resilient derailment-preventing means secured to the top and bottom of the vehicle and having flanged wheels engaging the top and bottom guide rails, and non-resilient derailment-preventing means secured to opposed sides of the vehicle, said non-resilient derailment-preventing means comprising U-shaped brackets carrying flangeless rollers of appreciable length rotatably mounted to turn about vertical axes and roll along the said side guide rails.

6. In combination with a vehicle, a roadbed therefor, tracks supported on said roadbed for supporting said vehicle for travel thereon, transversely spaced brackets supported from said roadbed beneath the vehicle and in the path of travel thereof, inturned flanges on said brackets, inverted guide rails extending in parallel relation to said tracks secured to the undersides of said flanges, a supporting member secured to the underside of the vehicle and extending downwardly therefrom between said brackets, a yoke secured to the lower end of said supporting member extending transversely thereto and having ends extending beneath said guide rails, spring casings surrounding the ends of said yoke, a spring in each casing positioned between an end of the yoke and the top of the casing, and a plurality of wheels supported on each casing and resiliently forced into engagement with the undersurface of one of said guide rails.

7. In combination with a vehicle, a downwardly extending vertical member secured to the underside of the vehicle, wheels resiliently mounted on the lower end of the vertical member, brackets supported from the road bed beneath the vehicle and having overhanging flanges at the upper ends thereof, inverted guide rails extending along the path of travel secured to the undersides of said brackets, said wheels being so arranged as to bear against and roll upon the under surfaces of said guide rails, frame members extending upwardly adjacent each side of the vehicle, guide rails secured to the said frame members extending in parallel relation to the path of travel of the vehicle, and non-resilient members secured to the sides of the vehicle and engaging the last mentioned guide rails.

8. In combination with a vehicle, a roadbed therefor, tracks supported on said roadbed for supporting said vehicle for travel thereon, transversely spaced brackets supported from said roadbed beneath the vehicle and in the path of travel thereof, inturned flanges on said brackets, inverted guide rails extending in parallel relation to said tracks secured to the undersides of said flanges, a supporting member secured to the underside of the vehicle and extending downwardly therefrom between said brackets, wheels resiliently supported from said supporting member and bearing upwardly against said guide rails, frame members extending upwardly adjacent each side of the vehicle, guide rails secured to said frame members extending in parallel relation to said tracks, and non-resilient members secured to the sides of the vehicle and engaging the last mentioned guide rails.

In testimony whereof, he has signed his name to this specification at Madrid, Spain, this 25th day of November, 1930.

MANUEL GOMIS CORNET.